US009660785B2

(12) United States Patent
Nishio et al.

(10) Patent No.: US 9,660,785 B2
(45) Date of Patent: *May 23, 2017

(54) TERMINAL APPARATUS AND CONTROL CHANNEL DETECTING METHOD

(71) Applicant: PANASONIC INTELLECTUAL PROPERTY CORPORATION OF AMERICA, Torrance, CA (US)

(72) Inventors: Akihiko Nishio, Osaka (JP); Hidetoshi Suzuki, Kanagawa (JP); Christian Wengerter, Kleinheubach (DE)

(73) Assignee: SUN PATENT TRUST, New York, NY (US)

( * ) Notice: Subject to any disclaimer, the term of this patent is extended or adjusted under 35 U.S.C. 154(b) by 242 days.

This patent is subject to a terminal disclaimer.

(21) Appl. No.: 14/551,802

(22) Filed: Nov. 24, 2014

(65) Prior Publication Data
US 2015/0078331 A1    Mar. 19, 2015

Related U.S. Application Data

(63) Continuation of application No. 12/522,368, filed as application No. PCT/JP2008/050137 on Jan. 9, 2008, now Pat. No. 8,934,418.

(30) Foreign Application Priority Data

Jan. 9, 2007    (JP) ................. 2007-001726

(51) Int. Cl.
H04W 4/00    (2009.01)
H04L 1/02    (2006.01)
(Continued)

(52) U.S. Cl.
CPC ............ H04L 5/0053 (2013.01); H04L 1/001 (2013.01); H04L 1/0004 (2013.01);
(Continued)

(58) Field of Classification Search
CPC ... H04L 5/0053; H04L 5/0005; H04L 5/0039; H04L 1/0038; H04L 5/0091;
(Continued)

(56) References Cited

U.S. PATENT DOCUMENTS

2006/0007887 A1    1/2006 Kwon
2006/0039318 A1*   2/2006 Oh .................. H04L 5/0007
                                        370/328
(Continued)

FOREIGN PATENT DOCUMENTS

WO    2006/082637    8/2006

OTHER PUBLICATIONS

Extended European Search Report dated Mar. 17, 2014.
(Continued)

Primary Examiner — Kiet Tang
(74) Attorney, Agent, or Firm — Dickinson Wright PLLC

(57) ABSTRACT

A radio communication base station device which can reduce the number of judgment times for a control signal in a mobile station, thereby suppressing power consumption by the mobile station. The radio communication base station device (100) includes: a mapping setting unit (122) which sets a mapping method in a mapping unit (102); the mapping unit (102) which maps a control signal to respective mobile stations to any of subcarriers constituting the OFDM symbol according to the mapping method set by the mapping setting unit (122); an MCS setting unit (121) which references a mapping table in which correlation between a plurality of MCS having different MCS levels and mapping methods is set according to the judgment result of the mapping setting unit (122) and sets MCS in encoding/modulation units (101-1 to 101-n).

12 Claims, 8 Drawing Sheets

(51) Int. Cl.
*H04L 5/00* (2006.01)
*H04L 1/00* (2006.01)
*H04L 1/04* (2006.01)
*H04L 27/26* (2006.01)

(52) U.S. Cl.
CPC .............. *H04L 1/0038* (2013.01); *H04L 1/04* (2013.01); *H04L 5/0005* (2013.01); *H04L 5/006* (2013.01); *H04L 5/0039* (2013.01); *H04L 5/0041* (2013.01); *H04L 5/0091* (2013.01); *H04L 5/0094* (2013.01); *H04L 5/0064* (2013.01); *H04L 27/2626* (2013.01)

(58) Field of Classification Search
CPC ....... H04L 5/0041; H04L 5/006; H04L 1/001; H04L 1/04; H04L 5/0094; H04L 1/0004; H04L 5/0064; H04L 27/2626
See application file for complete search history.

(56) References Cited

U.S. PATENT DOCUMENTS

| | | | |
|---|---|---|---|
| 2006/0109865 A1 | 5/2006 | Park | |
| 2006/0135164 A1 | 6/2006 | Kim | |
| 2006/0153227 A1 | 7/2006 | Hwang | |
| 2006/0246855 A1 | 11/2006 | Kato | |
| 2006/0251041 A1 | 11/2006 | Pajukoski | |
| 2007/0047483 A1* | 3/2007 | Khan | H04L 5/0053 370/328 |
| 2007/0066242 A1 | 3/2007 | Yi | |
| 2007/0115890 A1 | 5/2007 | Yi | |
| 2007/0211619 A1 | 9/2007 | Jalloul | |
| 2007/0220151 A1 | 9/2007 | Li | |
| 2007/0223614 A1* | 9/2007 | Kuchibhotla | H04L 1/1887 375/267 |
| 2007/0242636 A1* | 10/2007 | Kashima | H04L 5/0007 370/329 |
| 2007/0263579 A1* | 11/2007 | Ozluturk | H04W 74/004 370/338 |
| 2007/0263734 A1 | 11/2007 | Seki | |

OTHER PUBLICATIONS

International Search Report dated Apr. 22, 2008 with English translation.
3GPP TSG RAN WG1 Meeting #47, "Downlink control signaling," LG Electronics, R1-063177, Nov. 10, 2006, pp. 1-6.
3GPP TSG RAN WG1 Meeting #47, "Comparison between RB-level and Sub-carrier-level Distributed Transmission for Shared Data Channel in E-UTRA Downlink," NTT DoCoMo, et al., R1-063317, Nov. 10, 2006, pp. 1-14.
3GPP TSG-RAN WG1 Meeting #47, "Multiplexing and Link Adaptation of Downlink L1/L2 Control Signaling," Panasonic, R1-063186 Nov. 6-10, 2006, pp. 1-8.
S. K. Kim, et al., "Throughput Analysis of Band AMC Scheme in Broadband Wireless OFDMA System," Collage of Information & Communications, Korea University, I-4244-0270-0, 2006, pp. 1305-1310.

\* cited by examiner

| MCS | | MAPPING METHOD |
|---|---|---|
| MCS1 | QPSK, R = 1/8 | DISTRIBUTED MAPPING |
| MCS2 | QPSK, R = 1/3 | DISTRIBUTED MAPPING |
| MCS3 | QPSK, R = 1/2 | LOCALIZED MAPPING |
| MCS4 | QPSK, R = 3/4 | LOCALIZED MAPPING |

FIG.3

| CONTROL INFORMATION TYPE | MAPPING METHOD |
|---|---|
| UL ALLOCATION | DISTRIBUTED MAPPING |
| DL, NON-MIMO ALLOCATION | DISTRIBUTED MAPPING |
| DL, MIMO ALLOCATION | LOCALIZED MAPPING |

FIG.5

| CONTROL INFORMATION TYPE | MAPPING METHOD |
|---|---|
| DL, NON-MIMO ALLOCATION | DISTRIBUTED MAPPING |
| DL, MIMO ALLOCATION | LOCALIZED MAPPING |

FIG.6

TERMINAL APPARATUS AND CONTROL CHANNEL DETECTING METHOD

CROSS REFERENCE TO RELATED APPLICATIONS

This is a continuation application of application Ser. No. 12/522,368 filed Jul. 7, 2009, which is a national stage of PCT/JP2008/050137 filed Sep. 1, 2008, which is based on Japanese Application No. 2007-001726 filed Jan. 9, 2007, the entire contents of each of which are incorporated by reference herein.

TECHNICAL FIELD

The present invention relates to a radio communication base station apparatus and a control signal mapping method.

BACKGROUND ART

In recent years, in the field of radio communication, especially in mobile communication, a variety of information such as images and data in addition to speech is transmitted. The demand for higher speed transmission is expected to further increase in the future, and, to perform high-speed transmission, a radio transmission scheme that utilizes limited frequency resources more effectively and achieves high transmission efficiency is in demand.

OFDM (Orthogonal Frequency Division Multiplexing) is one of radio transmission techniques, to meet these demands. OFDM is one of multicarrier communication techniques, whereby data is transmitted in parallel using a large number of subcarriers, and it is known that OFDM has features of providing high frequency efficiency and reducing inter-symbol interference in a multipath environment and is effective to improve transmission efficiency.

Studies are being conducted to perform frequency scheduling transmission and frequency diversity transmission using this OFDM on the downlink, when a radio communication base station apparatus (hereinafter simply "base station") frequency-domain-multiplexes on a plurality of subcarriers data for a plurality of radio communication mobile station apparatuses (hereinafter simply "mobile stations").

In frequency scheduling transmission, the base station adaptively allocates subcarriers for mobile stations, based on the received quality of each frequency band in each mobile station, so that it is possible to obtain a maximum multi-user diversity effect. This frequency scheduling transmission is mainly suitable for mobile stations moving at low speed. Meanwhile, to perform frequency scheduling transmission, feedback of received quality information from the mobile stations to the base station is necessary, and therefore, frequency scheduling transmission is not suitable for the mobile station moving at high speed. Further, frequency scheduling transmission is usually performed on every resource block grouping a plurality of neighboring subcarriers. That is, in frequency scheduling transmission, data for mobile stations is mapped to subcarriers collectively per resource block, that is, localized mapping is performed, and therefore, not much high frequency diversity effect is obtained.

By contrast with this, in frequency diversity transmission, data for mobile stations is mapped to subcarriers in a distributed manner over the entire band, that is, distributed mapping is performed, so that a high frequency diversity effect can be obtained. Further, frequency diversity transmission does not require received quality information from the mobile stations, and therefore, frequency diversity transmission is a useful scheme where frequency scheduling transmission is difficult to apply. On the other hand, frequency diversity transmission is performed regardless of received quality in the mobile stations, and therefore it is not possible to obtain multi-user diversity effect such as in frequency scheduling transmission.

Further, to perform frequency scheduling transmission, the base station transmits, to the mobile stations of data transmission destinations per subframe, control signals formed with mobile station IDs (i.e. user IDs), resource block numbers, modulation and coding schemes (MCSs) for data channels, types of control information and so on, at the beginning of each subframe, prior to data transmission. Further, these control signals are transmitted in SCCHs (Shared Control Channel). SCCHs are provided in the number of mobile stations to which data is transmitted in the subframe, and the number of mobile stations per subframe is defined by, for example, frequency bandwidths available in the communication system. That is, at the beginning of each subframe, SCCHs in the same number as data channels in the subframe, is multiplexed over the same time.

Then, studies are underway to adopt frequency scheduling transmission and frequency diversity transmission to the SCCHs recently (see Non-patent Document 1). That is, studies are conducted to perform localized mapping and distributed mapping on a control signal transmitted in the SCCHs. In this case, control signals transmitted in the SCCHs include mapping methods of the control signals. Then, mobile stations receiving these control signals identify the content of these control signals by comparing these received control signals against all patterns that combinations of the mapping methods and the information contents can adopt one to one. That is, the mobile station performs blind detection of the control signal in the SCCHs.

Non-patent Document 1: 3GPP RAN WG1 Meeting document, R1-063177

DISCLOSURE OF INVENTION

Problems to be Solved by the Invention

For example, a case is assumed where, as shown in FIG. 1, four SCCHs are frequency-domain-multiplexed to subcarriers $f_1$ to $f_{16}$ forming one OFDM symbol such that three SCCHs (SCCH 1 to SCCH 3) are subject to localized mapping and one SCCH is subject to distributed mapping. That is, a case is assumed here where localized mapping and distributed mapping are mixed in communication resources of the frequency domain. This mapping pattern is reported to the mobile stations in advance.

Further, a case is assumed here where, in each mobile stations, there are three types of control information, that is, (1) DL (downlink) and non-MIMO (Multiple-Input Multiple-Output) allocation information (2) DL and MIMO allocation information (3) UL (uplink) allocation information and four kinds on MCSs.

The mobile station performs blind detection for control signals according to the mapping pattern to be reported (FIG. 1), so that the mobile station needs to try blind detection forty eight times in total, that is, three times (SCCH 1 to 3)×three times (types of control information)×four times (MCSs)=thirty six times for localized mapping, and one time (SCCH 4)×three times (types of control information)×four times (MCSs)=twelve times for distributed mapping.

In this way, the mobile stations need to try blind detection a large number of times, that is, forty eight times, and therefore, have to consume a large amount of power by blind detection for control signals.

It is therefore an object of the present invention to provide a base station and control signal mapping method that can reduce the number of detections on the control signals in the mobile stations and suppress power consumption of the mobile stations.

Means for Solving the Problem

The base station of the present invention adopts a configuration including: a setting section that sets up a mapping method associated with a MCS of a control signal or information content of the control signal; and a mapping section that maps the control signal to communication resources according to the mapping method set up.

Advantageous Effect of the Invention

According to the present invention, it is possible to reduce the number of detections on the control signals in the mobile stations and suppress power consumption of the mobile stations.

BRIEF DESCRIPTION OF DRAWINGS

FIG. 3 is a mapping table according to Embodiment 1;
FIG. 5 is a mapping table according to Embodiment (example 1);
FIG. 6 is a mapping table according to Embodiment (example 2)

BEST MODE FOR CARRYING OUT THE INVENTION

Now, embodiments of the present invention will be described in detail with reference to the accompanying drawings.

Embodiment 1

Figure 2:
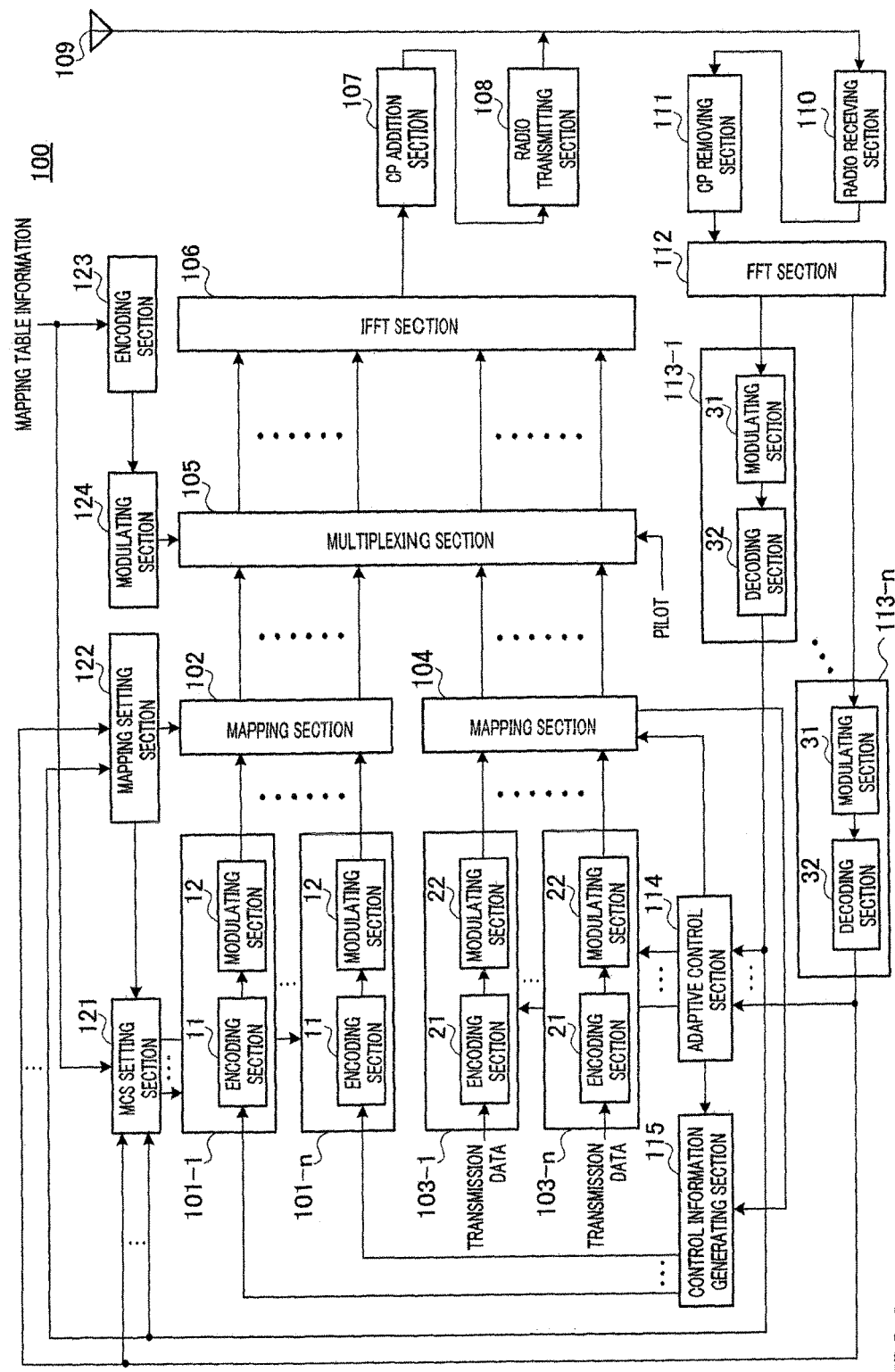
FIG. 2 is a block diagram showing the configuration of the base station according to Embodiment 1.

FIG. 2 shows the configuration of base station 100 of the present embodiment. Base station 100 multiplexes a plurality of SCCHs over the same time.

In base station 100, encoding and modulating sections 101-1 to 101-$n$, each formed with encoding section 11 and modulating section 12 used for an SCCH, encoding and modulating sections 103-1 to 103-$n$, each formed with encoding section 21 and modulating section 22 used for a data channel, and demodulating and decoding sections 113-1 to 113-$n$, each formed with demodulating section 31 and decoding section 32, are provided in the number of mobile stations n with which base station 100 can communicate. Further, encoding and modulating sections 101-1 to 101-$n$, encoding and modulating sections 103-1 to 103-$n$, and demodulating and decoding sections 113-1 to 113-$n$, are provided for mobile stations 1 to n, respectively.

MCS setting section 121 sets up the MCSs in encoding and modulating sections 101-1 to 101-$n$. MCS setting in MCS setting section 121 will be described later in detail.

In encoding and modulating sections 101-1 to 101-$n$, according to MCSs set up by MCS setting section 121, encoding sections 11 encode (i.e. perform a CRC (Cyclic Redundancy Check) encoding and error correcting encoding) control signals per mobile station transmitted in the SCCHs per mobile station, and modulating sections 12 modulate the control signals after encoding according to MCSs set up by MCS setting section 121 and output the modulated control signals to mapping section 102.

Mapping setting section 122 sets up a mapping method in mapping section 102, that is, the mapping method of control signals. Further, mapping setting sect ion 122 outputs received quality information received as input from decoding sections 32 (described later) to mapping section 102. Mapping method setting in mapping setting section 122 will be described later in detail.

According to mapping method set up by mapping setting section 122, mapping section 102 maps the control signals for the mobile stations to a plurality of subcarriers forming an OFDM symbol and outputs the mapped control signals to multiplexing section 105. That is, mapping section 102 maps the SCCH for each mobile station to one of a plurality of subcarriers forming an OFDM symbol. This mapping processing in mapping section 102 allows a plurality of SCCHs to be frequency-domain-multiplexed over the same time. The mapping process in mapping section 102 will be explained in detail.

In encoding and modulating sections 103-1 to 103-$n$, encoding sections 21 encode (i.e. perform a CRC encoding and error correcting encoding) transmission data per mobile station and modulating sections 22 modulate the transmission data after encoding and output the modulated transmission data to allocating section 105. The MCSs at this time follow MCS information received as input from adaptive control section 114.

According to the control from adaptive control section 114, mapping section 104 maps data for mobile stations to one of a plurality of subcarriers forming an OFDM symbol and outputs the mapped data to multiplexing section 105. At this time, mapping section 104 maps data for mobile stations to one of a plurality of subcarriers in resource block units. Further, mapping section 104 outputs the mobile station IDs and resource block numbers as mapping result information for data (information showing which data for which mobile station is mapped to which resource blocks) to control signal generating section 115.

MCS setting section 121 and encoding section 123 receive as input information of a mapping table, in which the associations between a plurality of MCSs having different MCS levels and a plurality of mapping methods are setup (i.e. mapping table information). This mapping table information is reported from a radio communication control station apparatus (i.e. Radio Network Controller) that is located in a higher layer than base station 100. Further, this mapping table information is transmitted from base station 100 to the mobile stations with a BCH (i.e. Broadcast Channel), a DPCCH (Dedicated Physical Control Channel), a RRC signaling (Radio Resource Control) and so on.

Encoding section 123 encodes the mapping table information and modulating section 124 modulates the mapping table information after encoding and outputs the modulated mapping table information multiplexing section 105.

Multiplexing section 105 time-domain-multiplexes the data received as input from mapping section 104, the control signals received as input from mapping section 102, the mapping table information received as input from modulating section 124 and pilots and outputs time-domain-multiplexed data to IFFT (Inverse Fast Fourier Trans form) section 106. The control signals are multiplexed, for example, every subframe, and multiplexed at the beginning of every subframe. The mapping table information is multiplexed, for example, upon the initial signaling after the mobile stations start communication. The pilots are multiplexed at predetermined time intervals.

IFFT section 106 performs an IFFT on the control signals mapped to a plurality of subcarriers or the data mapped to a plurality of subcarriers, to generate an OFDM symbol, which is a multicarrier signal. That is, IFFT section 106 generates an OFDM symbol where a plurality of SCCHs are frequency-domain-multiplexed or an OFDM symbol where a plurality of data channels are frequency-domain-multiplexed. Further, the OFDM symbol formed with the SCCHs and the OFDM symbol formed with the data channels are time-domain-multiplexed in one subframe. Further, IFFT section 106 performs an IFFT on the mapping table information and the pilots, to generate an OFDM symbol. The mapping table information is mapped to a specific subcarrier in one OFDM symbol and the pilots are mapped to all subcarriers in one OFDM symbol.

CP (Cyclic Prefix) addition section 107 attaches the same signal as the tail part of the OFDM symbol, to the beginning of that OFDM symbol, as a CP.

Radio transmitting section 108 performs transmission processing including D/A conversion, amplification and up-conversion, on the OFDM symbol with an attachment of a CP and transmits the OFDM symbol with a CP from antenna 109 to the mobile stations.

On the other hand, radio receiving section 110 receives via antenna 109 maximum n OFDM symbols transmitted at the same time from a maximum of n mobile stations, and performs receiving processing including down-conversion and A/D conversion on these OFDM symbols.

CP removing section 111 removes the CPs from the OFDM symbols after receiving processing.

FFT (Fast Fourier Transform) section 112 performs an FFT on the OFDM symbols after the CP removal to obtain the mobile station-specific signals multiplexed in the frequency domain. Here, the mobile stations transmit signals using different subcarriers or different resource blocks, and the mobile station-specific signals include received quality information reported from the mobile stations. Each mobile station is able to measure received quality from, for example, the received SNR, received SIR, received SINR, received CINR, received power, interference power, bit error rate, throughput, MCS that achieves a predetermined error rate, and so on. In addition, received quality information may be referred to as "CQI (Channel Quality Indicator)" or "CSI (Channel State Information)," for example.

In demodulating and decoding sections 113-1 to 113-n, demodulating sections 31 modulate the signal after an FFT and, decoding sections 32 decode the signal after demodulation, to acquire received data. Received quality information in the received data is received as input to adaptive control section 114, MCS setting section 121 and mapping setting section 122.

Based on the received quality information reported from the mobile stations, adaptive control section 114 performs adaptive control on the transmission data for the mobile stations. That is, based on the received quality information, adaptive control section 114 selects the MCS that can achieve the required error rate for encoding and modulating sections 103-1 to 103-n and outputs the MCS information. This adaptive control is carried out every resource block. That is, adaptive control section 114 performs adaptive control on data channels every several resource blocks. Further, based on the received quality information, adaptive control section 114 determines for mapping section 104, to which the resource blocks transmission data for the mobile stations is mapped, using scheduling algorithms such as the maximum SIR method and the proportional fairness method. Further, adaptive control section 114 outputs the MCS information per mobile station to control signal generating section 115.

Control signal generating section 115 generates control signals per mobile station formed with the mapping result information per mobile station, the MCS information per mobile station and the types of control information of the control signals, and outputs the generated control signals to corresponding encoding sections 11. As described above, there are three types of control information, that is, (1) DL and non-MIMO allocation information, (2) DL and MIMO allocation information and, (3) UL allocation information, and control signal generating section 115 selects one of the three types of control information.

Next, the MCS setting in MCS setting section 121, the mapping method setting in mapping setting section 122 and the mapping in mapping section 102 will be described in detail.

With regards to the modulation scheme, the modulation level becomes higher (i.e. M-ary modulation number is larger) when the MCS level is higher, and, with regards to the coding rate, the coding rate becomes higher when the MCS level is higher. That is, the transmission rate (i.e. bit rate) increases when the MCS level is higher. Meanwhile, error rate performances degrade.

Here, received quality in mobile stations located near a cell boundary is susceptible to the influence of the fluctuation of interference from neighboring cells, and therefore, the accuracy of received quality information per frequency band becomes poor in mobile stations located near a cell boundary. Consequently, distributed mapping, which does not require received quality information, is a suitable mapping method for mobile stations located near a cell boundary. On the other hand, received quality in mobile stations located near the center of a cell is not susceptible to the influence of the fluctuation of interference from neighboring cells, and therefore, the accuracy of received quality information per frequency band is good in the mobile stations located near the center of a cell. Consequently, localized mapping, which is performed based on received quality information per frequency band, is a suitable mapping method for mobile stations located near the center of a cell.

Further, it is necessary for the SCCHs for mobile stations located near a cell boundary to set up a MCS having a low MCS level to fulfill the required received quality. On the other hand, even if a MCS having a high MCS level is set up for the SCCHs for mobile stations located near the center of a cell, it is possible to fulfill the required received quality.

It naturally follows from the above that distributed mapping is suitable for the SCCHs for mobile stations located near a cell boundary, that is, the SCCHs in which a MCS having a low MCS level is set up, and localized mapping is suitable for the SCCHs for mobile stations located near the center of a cell, that is, SCCHs in which a MCS having a high MCS level is set up.

Now, with the present embodiment, the SCCHs are mapped and MCSs are set up for the SCCHs as below.

In the following explanation, as described above, the mapping pattern shown in FIG. 1 is reported to mobile stations in advance. Further, as described above, four SCCHs are frequency-domain-multiplexed in one OFDM symbol. That is, the number of mobile stations allocated per subframe is four.

FIG. 3 shows the mapping table according to the present embodiment. In this mapping table, MCS 1 is the lowest MCS level and MCS 4 is the highest MCS level among MCS 1 to MCS 4. That is, in this mapping table, associations between the MCSs having low MCS levels and distributed mapping are provided and associations between the MCSs having high MCS levels and localized mapping are provided. These associations are provided in advance such that the number of times blind detection is performed for the control signals by the mobile stations is equal or less than a predetermined value. For example, in the present embodiment, the associations are provided in advance such that the number of times blind detection is performed in the mobile stations is less than half of a case where the associations are not provided.

For example, mapping setting section 122 finds average received quality per mobile station in the entire frequency band (that is, subcarriers $f_1$ to $f_{16}$), and, sets up localized mapping for the control signal mapping method for the mobile stations having the top three average received quality (hereinafter "upper mobile stations") and sets up distributed mapping for the control signal mapping method for the mobile station having the bottom averaged received quality (hereinafter "the lowest mobile station"). Then, mapping setting section 122 outputs the setting result to mapping section 102 and MCS setting section 121.

Figure 1:
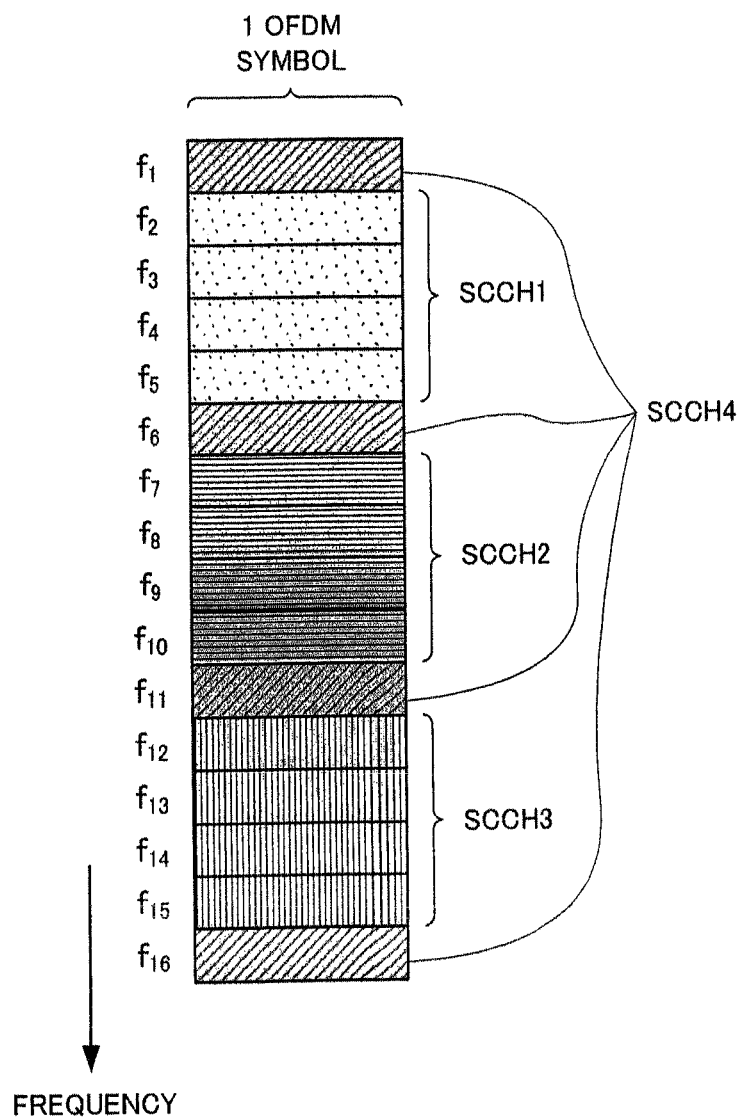
FIG. 1 is an example of a mapping pattern (example 1)

According to the setting result in mapping setting section 122, mapping section 102 maps control signals for the upper three mobile stations to one of SCCH 1 to SCCH 3 shown in FIG. 1, and maps the control signal for the lowest mobile station to SCCH 4.

At this time, mapping section 102 compares average received quality of the frequency band corresponding to SCCH 1 (i.e. subcarriers $f_2$ to $f_5$) between the upper three mobile stations, and maps the control signal for the mobile station of the highest received quality to SCCH 1. Further, mapping section 102 compares average received quality of the frequency band corresponding to SCCH 2 (i.e. subcarriers $f_7$ to $f_{10}$) between the remaining upper two mobile stations, and maps the control signal for the mobile station of higher average received quality to SCCH 2. Then, mapping section 102 maps the control signal for the remaining upper one mobile station to SCCH 3.

Meanwhile, according to the setting result in mapping setting section 122, MCS setting section 121 selects one MCS out of four MCSs for the control signals for the four mobile stations, with reference to the mapping table of FIG. 3 represented as the mapping table information. That is, MCS setting section 121 sets up MCSs having lower MCS levels, that is, MCS 1 or MCS 2, for the control signals for which distributed mapping is set up, and sets up the MCS having higher MCS levels, that is, MCS 3 or MCS 4, for the control signals for which localized mapping is set up.

Further, as for the control signals for which distributed mapping is set up, MCS setting section 121 finds average received quality of the entire frequency band of the mobile stations to which control signals are transmitted (i.e. subcarriers $f_1$ to $f_{16}$), and sets up MCS 1 when this average received quality is less than the threshold value TH 1 and sets up MCS 2 when this average received quality is equal or greater than the threshold value TH 1. Further, as for the control signals for which localized mapping is setup, MCS setting section 121 finds average received quality of the frequency bands corresponding to the SCCHs to which the control signal is mapped, and sets up MCS 3 when this average received quality is less than the threshold value TH 2 and sets up MCS 4 when this average received quality is equal or greater than the threshold value TH 2. The relationship between the threshold values is TH 1<TH 2.

In this way, according to the present embodiment, control signals are mapped to communication resources of the frequency domain according to the mapping methods associated with the MCSs of the control signals.

By mapping control signals as such, the number of times of blind detections in the mobile stations receiving control signals is as follows. Here, as described above, there are three types of control information per mobile station.

In the present embodiment, distributed mapping is associated with two MCSs, that is, MCS 1 and MCS 2, and localized mapping is associated with two MCSs, that is, MCS 3 and MCS 4. Consequently, the mobile stations can decide the mapping method and decide the MCS together. That is, if the mapping method is decided to be distributed mapping, the mobile stations need only to try blind detection two times for a MCS decision, for MCS1 and for MCS 2, and, similarly, if the mapping method is decided to be localized mapping, the mobile stations need only to try blind detection two times for a MCS decision, for MCS 3 and MCS 4.

Consequently, in the mobile stations performing blind detection for the control signals according to the mapping pattern to be reported (FIG. 1), it is only necessary to try twenty four times of blind detection in total, that is, three times (SCCH 1 to 3)×three times (types of control information)×two times (MCSs)=eighteen times for localized mapping, and one time (SCCH 4)×three times (types of control information)×two times (MCSs)=six times for distributed mapping. That is, the number of times blind detection is performed for the control signals in the mobile stations is reduced by half compared to forty eight times in a conventional case.

In this way, according to the present embodiment, the mapping methods of control signals and the MCSs of control signals are associated, so that it is possible to reduce the number of detections on control signals in the mobile stations. Consequently, according to the present embodiment, it is possible to reduce power consumption of the mobile stations.

Further, according to the present embodiment, MCSs suitable for mapping methods are set up such that distributed mapping is set up for control signals for which MCSs having low MCS levels are set up and localized mapping is set up for control signals for which MCSs having high MCS levels are set up, so that it is possible to improve the transmission efficiency of SCCHs.

Although a case has been explained above where two MCSs are associated with distributed mapping and localized mapping apiece, one MCS may be associated with distributed mapping and localized mapping apiece. In this case, the number of times blind detection is performed in each mobile station is twelve times in total, that is, three times (SCCH 1 to 3)×three times (types of control information)×one time (MCS)=nine times for localized mapping, and one time (SCCH 4)×three times (types of control information)×one time (MCS)=three times for distributed mapping. Therefore, it is possible to reduce the number of times of detections further on the control signals in the mobile stations. In this case, in the setting of MCSs of control signals, comparison between average received quality in MCS setting section 121 and threshold values is not necessary.

Embodiment 2

With this embodiment, the control signals are mapped to communication resources of the frequency domain according to the mapping methods associated with information contents of the control signals.

Figure 4:
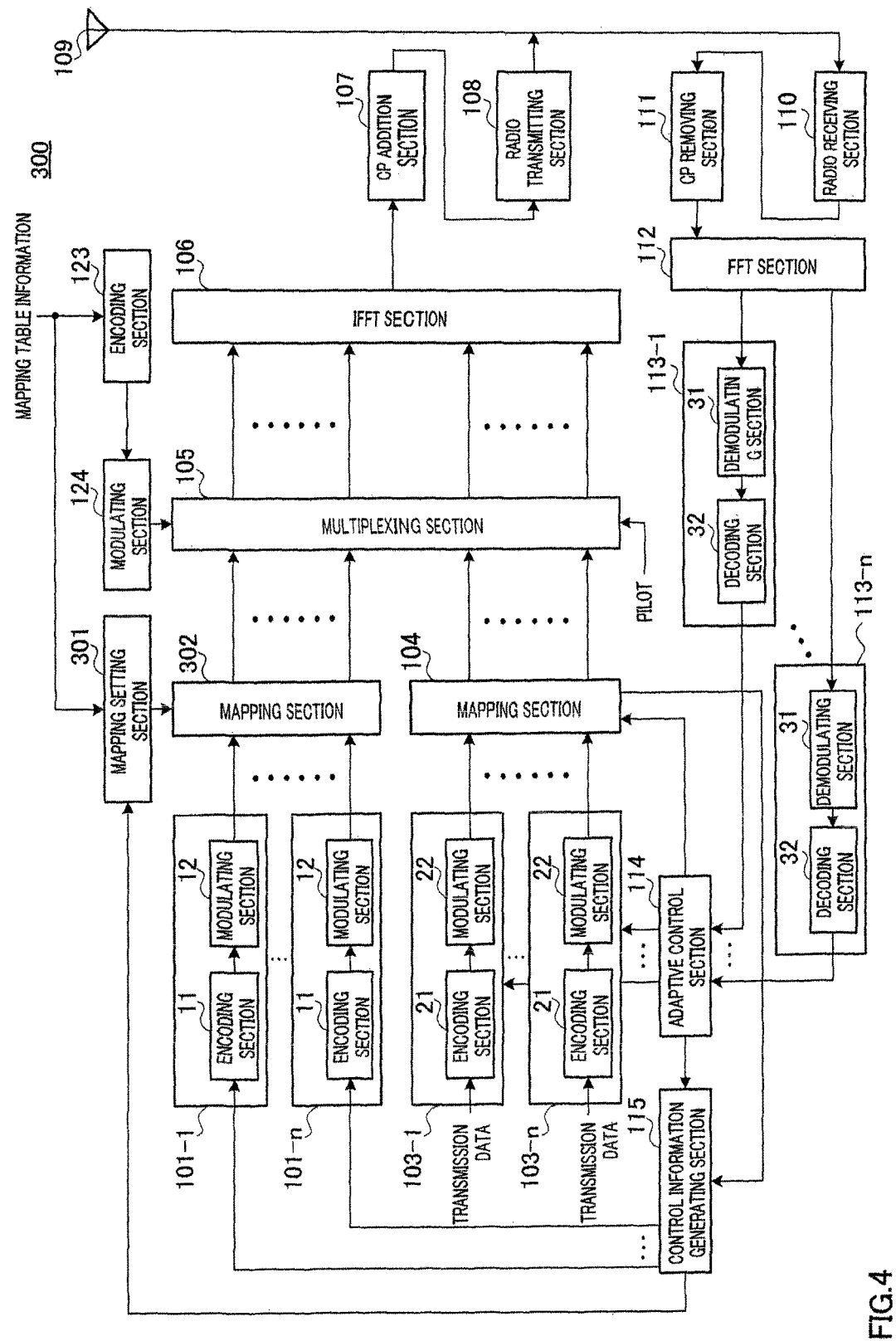
FIG. 4 is a block diagram showing the configuration of the base station according to Embodiment 2.

FIG. 4 shows the configuration of base station 300 of the present embodiment. In FIG. 4, the same components will be assigned the same reference numerals as in FIG. 2 (Embodiment 1), therefore the description thereof will be omitted.

Decoding sections 32 output received quality information in received data to adaptive control section 114.

Control signal generating section 115 outputs the selected type of control information to mapping setting section 301 in addition to processing explained in Embodiment 1.

Mapping setting section 301 and encoding section 123 receive as input information of a mapping table in which the associations between a plurality of different types of control information and a plurality of mapping methods are setup (i.e. mapping table information). This mapping table information is reported from a radio communication control station apparatus that is located in a higher layer than base station 300. Further, this mapping table information is transmitted from base station 300 to the mobile stations with a BCH, a DPCCH, a RRC signaling and so on.

Mapping setting section 301 sets up mapping methods in mapping section 302, that is, mapping methods of control signals.

According to mapping method set up by mapping setting section 301, mapping section 302 maps the control signals for the mobile stations to a plurality of subcarriers forming an OFDM symbol, and outputs the mapped control signals to multiplexing section 105. That is, mapping section 302 maps the SCCH for each mobile station to one of a plurality of subcarriers forming an OFDM symbol. This mapping processing in mapping section 302 allows a plurality of SCCHs to be frequency-domain-multiplexed over the same time.

Next, the mapping method setting in mapping setting section 301 and the mapping in mapping section 302 will be described in detail.

As described above, distributed mapping, which does not require received quality information, is a suitable mapping method for mobile stations located near a cell boundary. On the other hand, localized mapping, which is performed based on received quality per frequency band, is a suitable a mapping method for mobile stations located near the center of a cell.

Further, non-MIMO transmission is more likely to be applied to mobile stations, which are located near a cell boundary and which are difficult to be divided in space due to the influence of interference from neighboring cells. On the other hand, MIMO transmission is more likely to be applied to mobile stations, which are located near the center of a cell and which have little interference from neighboring cells and can be divided in space accurately.

It naturally follows from the above that distributed mapping is suitable for the SCCHs for mobile stations located near a cell boundary, that is, the SCCHs for mobile stations to which non-MIMO transmission is applied, and, localized mapping is suitable for the SCCHs for mobile stations located near the center of a cell, that is, the SCCHs for mobile stations to which MIMO transmission is applied.

Further, although uplink data is present at the timing uplink is allocated is possible that downlink data is not present. That is, at the timing uplink is allocated, it is possible not to report received quality information for performing frequency scheduling transmission on downlink data from mobile stations to the base station. Consequently, distributed mapping that does not require received quality information is suitable for the SCCHs formed with uplink allocation information.

Then, with the present embodiment, the SCCHs are mapped as follows.

In the following explanation, as described above, the mapping pattern shown in FIG. 1 is reported to mobile stations in advance. Further, as described above, four SCCHs are frequency-domain-multiplexed in one OFDM symbol. That is, the number of mobile stations allocated per subframe is four.

Further, a case is assumed where there are four kinds of MCSs.

FIG. 5 shows the mapping table according to the present embodiment. That is, in this mapping table, associations between UL allocation information and distributed mapping are provided, associations between DL and non-MIMO allocation information and distributed mapping are provided, and associations between DL and MIMO allocation information and localized mapping are provided. That is, in this mapping table, associations between the types of control information, that is, the information contents of control signals, and control signal mapping methods are provided. Similar to Embodiment 1, these associations are provided in advance such that the number of times blind detection is performed for the control signals by the mobile stations is equal or less than a predetermined value. For example, in the present embodiment, similar to Embodiment 1, the associations are provided in advance such that the number of times blind detection is performed in the mobile stations is less than half of a case where the associations are not provided.

According to the type of control information received as input from control signal generating section 115, with reference to the mapping table of FIG. 5 represented as the mapping table information, and, mapping setting section 301 sets up the mapping method for control signals where the type of control information is UL allocation information to be distributed mapping, sets up the mapping method for control signals where the type of control information is DL and non-MIMO allocation information to be distributed mapping, and sets up the mapping method for control signals where the type of control information is DL and MIMO allocation information to be localized mapping. That is, mapping setting section 301 sets up localized mapping for control signals including allocation information for MIMO transmission (i.e. DL and MIMO allocation information), and sets up distributed mapping for control signals not including allocation information for MIMO transmission (i.e. DL and MIMO allocation information). Further, mapping setting section 301 sets up distributed mapping for control signals including allocation information for uplink (i.e. uplink allocation information). Then, mapping setting section 301 outputs the setting result to mapping section 302.

According to the setting result in mapping setting section 301, mapping section 302 maps the control signals for the mobile stations to one of SCCH 1 to 4 shown in FIG. 1.

In this way, according to the present embodiment, control signals are mapped to communication resources of the frequency domain according to the mapping methods associated with the types of control information of control signals.

By mapping control signals as such, the number of times of blind detections in the mobile stations receiving control signals is as follows.

In the present embodiment, distributed mapping is associated with UL allocation information and DL and non-MIMO allocation information, and localized mapping is associated with DL and MIMO allocation information. Consequently, the mobile stations can decide the mapping method and decide the type of control information together. That is, if the mapping method is decided to be distributed mapping, the mobile stations need only to try blind detection two times for a decision of a type of control information, for UL allocation information and DL and non MIMO allocation information, and, similarly, if the mapping method is decided to be localized mapping, the mobile stations need only to try blind detection one time for a decision of a type of control information, for DL and MIMO-allocation information.

Consequently, in the mobile stations performing blind detection for the control signals according to the mapping pattern to be reported (FIG. 1), it is only necessary to try twenty times of blind detection in total, that is, three times (SCCH 1 to 3)×one time (type of control information)×four times (MCSs)=twelve times for localized mapping, and one time (SCCH 4)×two times (types of control information)×four times (MCSs)=eight times for distributed mapping. That is, the number of times blind detection is performed for the control signals in the mobile stations is reduced by half compared to forty eight times in a conventional case.

In this way, according to the present embodiment, the mapping methods of control signals and the types of control information of control signals are associated, so that it is possible to reduce the number of detections on control signals in the mobile stations. Consequently, according to the present embodiment, similar to Embodiment 1, it is possible to reduce power consumption of the mobile stations.

In the case where, whether MIMO transmission or non-MIMO transmission is performed is known in the mobile stations in advance, the number of times blind detection is performed in the mobile stations is as follows. In this case, the number of times blind detection is performed in the mobile station to be subject to MIMO transmission is sixteen times in total, that is, three times (SCCH 1 to 3)×one time (type of control information)×four times (MCSs)=twelve times for localized mapping, and one time (SCCH 4)×one time (types of control information)×four times (MCS)=four times for distributed mapping. Therefore, it is possible to reduce the number of times of detections further on the control signals in the mobile stations.

Further, in the case where there are only two types of control information, that is, (1) DL and non-MIMO allocation information and (2) DL and MIMO allocation information, the mapping methods may be set up in the same way as above using the mapping table shown in FIG. 6. In this case, in the mobile stations performing blind detection for the control signals according to the mapping pattern to be reported (FIG. 1), it is only necessary to try sixteen times of blind detection in total, that is, three times (SCCH 1 to 3)×one time (type of control information)×four times (MCSs)=twelve times for localized mapping, and one time (SCCH 4)×one time (types of control information)×four times (MCSs)=four times for distributed mapping. Further, in the case where, whether MIMO transmission is conducted or non-MIMO transmission is conducted is known in the mobile stations in advance, the number of times blind detection is performed in the mobile stations subject to MIMO transmission is sixteen times in total, that is, three times (SCCH 1 to 3)×one time (type of control information)×four times (MCSs)=twelve times for localized mapping, and one time (SCCH 4)×one time (type of control information)×four times (MCSs)=four times for distributed mapping. The number of times blind detection is performed in the mobile stations subject to non-MIMO transmission is, one time (SCCH 4)×one time (type of control information)×four times (MCSs)=four times. Therefore, it is possible to reduce the number of times of detections further on the control signals in the mobile stations.

Further, the DL and MIMO allocation information may be further classified into SU-MIMO (Single-User-MIMO) information allocation information and MU-MIMO (Multi-User-MIMO) information allocation information.

Embodiments of the present invention have been explained.

The present invention may be implemented to combine Embodiment 1 and Embodiment 2. By implementing the combination, it is possible to reduce the number of detections further on control signals in the mobile stations.

Figure 7:
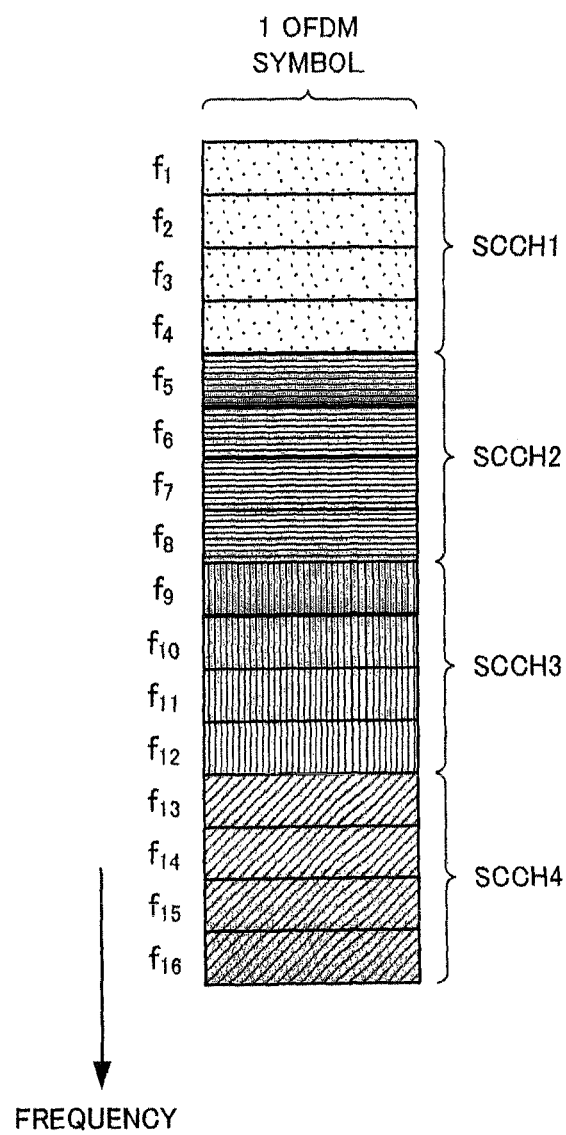
FIG. 7 is an example of a mapping pattern (example 2)
Figure 8:
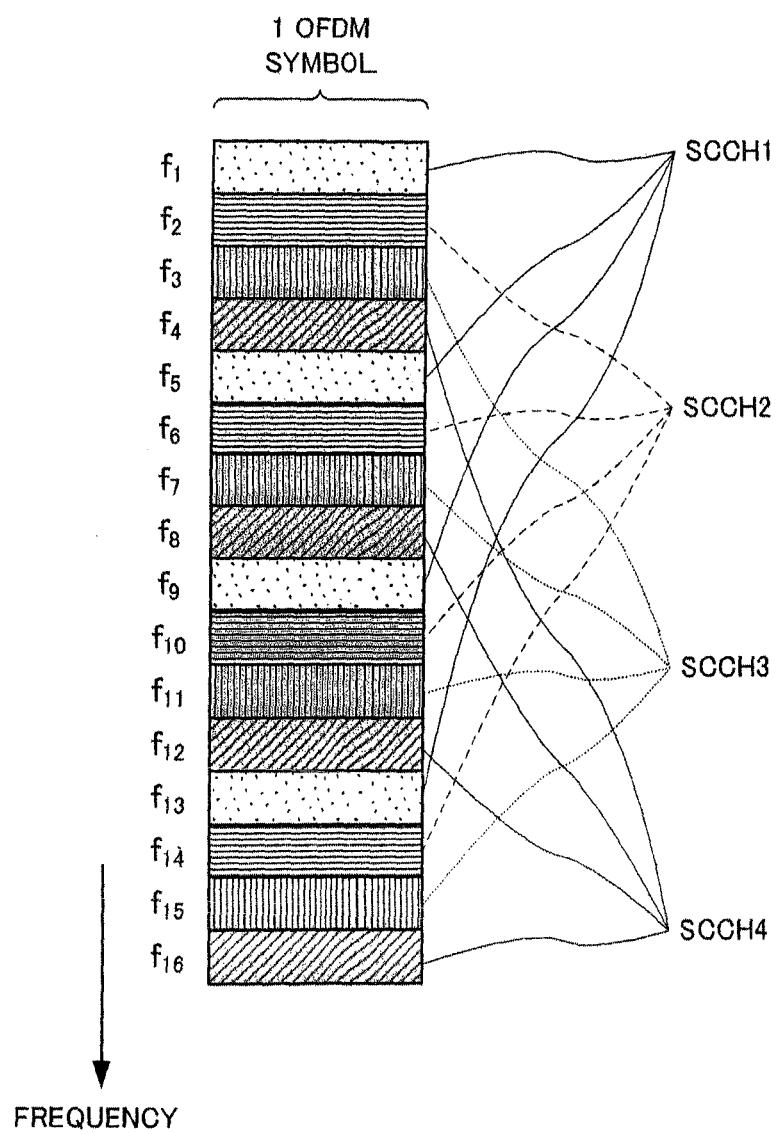
FIG. 8 is an example of a mapping pattern (example 3)

Further, although a mapping pattern (FIG. 1) in which localized mapping and distributed mapping are mixed in communication resources of the frequency domain is shown in the above description, a mapping pattern (FIG. 7), in which four SCCHs (SCCH 1 to SCCH 4) are subject to localized mapping to subcarriers $f_1$ to $f_{15}$ forming one OFDM symbol and only localized mapping is present in communication resources of the frequency domain, and, a mapping pattern (FIG. 8), in which four SCCHs (SCCH 1 to SCCH 4) are subject to distributed mapping to subcarriers $f_1$ to $f_{16}$ forming one OFDM symbol and only distributed mapping is present in communication resources of the frequency domain, are implemented by the present invention. Whether one of a mapping pattern of FIG. 1, mapping pattern in FIG. 7 and a mapping pattern in FIG. 8 is employed is reported from the base station to the mobile stations in advance with a BCH, a DPCCH, a RRC signaling and so on. When the mapping pattern shown in FIG. 7 or the mapping pattern FIG. 8 is employed, the mobile stations need only to perform blind detection for only one of localized mapping and distributed mapping, so that it is possible to reduce the number of detections further on the control signals in the mobile stations.

Figure 9:
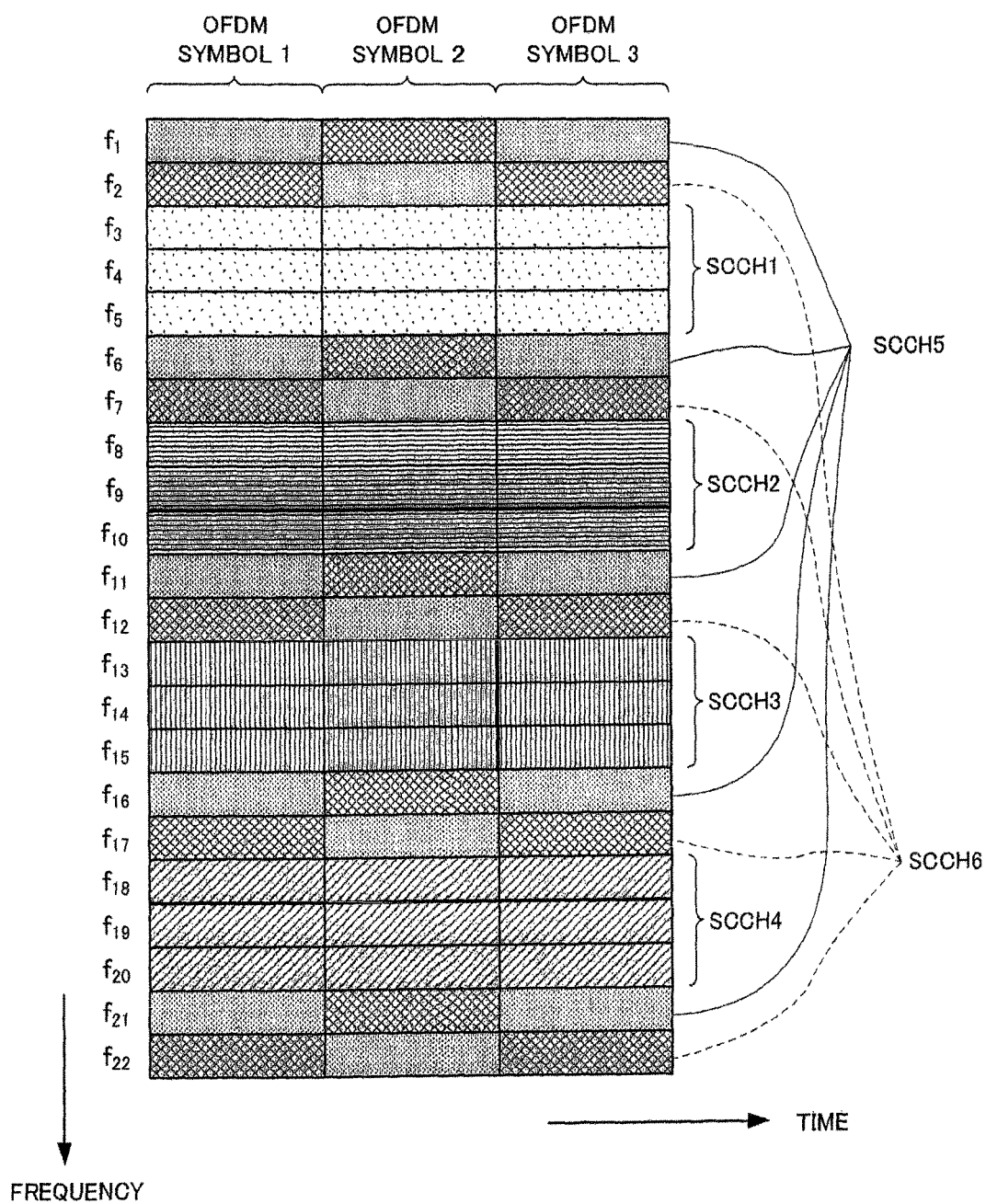
FIG. 9 illustrates a communication resource example.

Further, the communication resources may be defined not only by frequency, and may be defined by time and frequency as shown in FIG. 9.

Further, the mapping methods to be allocated may be determined per mobile station in advance. For example, the mapping methods are determined in advance such that localized mapping is set up for mobile stations near the center of a cell and distributed mapping is set up for mobile stations near a cell boundary. By this means, the mobile stations need only to perform blind detection for only one of localized mapping and distributed mapping, so that it is possible to reduce the number of detections further on the control signals in the mobile stations.

Further, each mobile station may limit the SCCHs to be subject to blind detection in advance. For example, in FIG. 1, it is determined in advance that a mobile station receives SCCH 1 only and another mobile station receives SCCH 2 only. By this means, the mobile stations need only to perform blind detection for specific SCCHs alone, so that it is possible to reduce the number of detections further on the control signals in the mobile stations.

Further, the subframe used in the above description may be another transmission time unit, for example, a time slot or a frame.

Further, the resource block used in the above description may be another transmission unit in the frequency domain, for example, a subcarrier block.

Further, a mobile station may be referred to as "UE," base station may be referred to as "Node-B," and a subcarrier may be referred to as "tone." Further, a resource block may be referred to as a "subband", a "subcarrier block", a "subchannel," or a "chunk." Further, a CP may be referred to as a "guard interval (GI)."

Further, in the SCCH, control signals such as uplink channel allocation information, an Ack/Nack signal, PI (Paging Indicator) and a random access response, besides a mobile station ID, an resource block number and MCS information may be transmitted.

Further, the present invention may be applied to all channels in which radio communication apparatuses of the receiving side have to detect transmission information and transmission parameters by blind detection.

Further, although control information for one mobile station is transmitted in one SCCH in the above explanation, a plurality of mobile stations may be grouped and one SCCH is used per group.

Further, although an example has been explained with the above explanation, where the SCCH is allocated at the beginning of a subframe, the SCCH may be allocated to positions that are not the beginning of the subframe, that is, the second OFDM symbol in a subframe for example.

Further, the SCCH multiplexing method is not limited to frequency multiplexing, and, may be for example, code multiplexing.

Further, the transform method between the frequency domain and the time domain is not limited to an IFFT or FFT.

Further, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSIs, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2007-001726, filed on Jan. 9, 2007, including the specification, drawings and abstract, is incorporated herein by reference in its entirety.

INDUSTRIAL APPLICABILITY

The present invention is applicable to, for example, mobile station communication systems.

The invention claimed is:

1. A terminal apparatus, comprising:
a receiver structured to receive a control channel, which is snapped to a first resource defined by frequency and time in accordance with a mapping method, and to receive downlink data mapped to a second resource in accordance with downlink assignment information, wherein the control channel includes a first control channel carrying the downlink assignment information indicating the second resource to which downlink data is allocated and a second control channel carrying uplink assignment information indicating a third resource to which uplink data is allocated; and
circuitry structured to detect the control channel,
wherein:
the mapping method is one of a localized mapping and a distributed mapping;
the first control channel carrying the downlink assignment information is mapped to a first region of the first resource;
the second control channel carrying the uplink assignment information is mapped to a second region of the first resource, the first region being different from the second region; and
the control channel is mapped to an Orthogonal Frequency Division Multiplexing (OFDM) symbol other than at a beginning of a subframe.

2. The terminal apparatus according to claim 1, wherein one of the distributed mapping and the localized mapping is set as the mapping method according to a modulation and coding scheme level for the control channel.

3. The terminal apparatus according to claim 1, wherein one of the localized mapping and the distributed mapping is set as the mapping method according to whether the control channel includes assignment information for multiple-input multiple-output transmission.

4. The terminal apparatus according to claim 1, wherein the distributed mapping is set as the mapping method for the second control channel carrying the uplink assignment information.

5. The terminal apparatus according to claim 1, wherein each of different modulation and coding schemes for the control channel is associated with one of the distributed mapping and the localized mapping.

6. The terminal apparatus according to claim 1, wherein each of the first control channel carrying the downlink assignment information and the second control channel carrying the uplink assignment information is associated with one of the distributed mapping and the localized mapping.

7. The terminal apparatus according to claim 1, wherein each of different modulation and coding schemes for the control channel is associated with one of the distributed mapping and the localized mapping such that a number of times of detection on the control channel is equal to or less than a predetermined value.

8. The terminal apparatus according to claim 1, wherein each of the first control channel including the downlink assignment information and the second control channel including the uplink assignment information is associated with one of the distributed mapping and the localized mapping such that a number of times of detection on the control channel is equal to or less than a predetermined value.

9. The terminal apparatus according to claim 1, wherein the downlink assignment information or the uplink assignment information indicates a resource block to which data to the terminal apparatus is allocated, and the control channel includes an identification of the terminal apparatus and information on a modulation and coding scheme.

10. The terminal apparatus according to claim 1, wherein in the distributed mapping, the control channel is mapped in a distributed fashion to a frequency domain, and in the localized mapping, the control channel is mapped in a localized fashion to the frequency domain.

11. The terminal apparatus according to claim 1, wherein the control channel is mapped to the first resource per time slot.

12. A method for detecting a control channel comprising:
receiving the control channel, which is mapped to a first resource defined by frequency and time in accordance with a mapping method;
detecting, by a processor, the control channel; and
receiving downlink data mapped to a second resource in accordance with downlink assignment information, wherein the control channel includes a first control channel carrying the downlink assignment information indicating the second resource to which downlink data is allocated and a second control channel carrying uplink assignment information indicating a third resource to which uplink data is allocated,
wherein:
the mapping method is one of a localized mapping and a distributed mapping;
the first control channel carrying the downlink assignment information is mapped to a first region of the first resource;
the second control channel carrying the uplink assignment information is mapped to a second region of the first resource, the first region being different from the second region; and
the control channel is mapped to an Orthogonal Frequency Division Multiplexing (OFDM) symbol other than at a beginning of a subframe.

* * * * *